United States Patent
Kamm

(10) Patent No.: US 11,343,074 B2
(45) Date of Patent: May 24, 2022

(54) BLOCK-CHAIN BASED IDENTITY SYSTEM

(71) Applicant: GIESECKE+DEVRIENT MOBILE SECURITY GMBH, Munich (DE)

(72) Inventor: Frank-Michael Kamm, Holzkirchen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/963,100

(22) PCT Filed: Jan. 15, 2019

(86) PCT No.: PCT/EP2019/000014
§ 371 (c)(1),
(2) Date: Jul. 17, 2020

(87) PCT Pub. No.: WO2019/141505
PCT Pub. Date: Jul. 25, 2019

(65) Prior Publication Data
US 2020/0374140 A1 Nov. 26, 2020

(30) Foreign Application Priority Data
Jan. 22, 2018 (DE) .................... 10 2018 000 471.7

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/0819* (2013.01); *H04L 9/3242* (2013.01); *H04L 9/3271* (2013.01); *H04L 2209/38* (2013.01)

(58) Field of Classification Search
None
See application file for complete search history.

(56) References Cited

U.S. PATENT DOCUMENTS

| 9,635,000 B1 | 4/2017 | Muftic |
| 2007/0198834 A1* | 8/2007 | Ksontini ................. G06F 21/34 455/411 |

(Continued)

FOREIGN PATENT DOCUMENTS

| AU | 2017100968 A4 | 9/2017 |
| CN | 106682530 A | 5/2017 |
| CN | 106897593 A | 6/2017 |

OTHER PUBLICATIONS

International Search Report and Written Opinion from PCT Application No. PCT/EP2019/000014, dated Apr. 4, 2019.
(Continued)

*Primary Examiner* — Andrew J Steinle
(74) *Attorney, Agent, or Firm* — Workman Nydegger

(57) ABSTRACT

A method for the confidential verification of an electronic identity includes applying block chain. The method allows an acting party to recognize a block-chain identity while at the same time a level of confidentiality of the respective identity and its identity attributes is maintained. A correspondingly adapted identity system and a computer program product with control commands are arranged to implement the method and/or operate the proposed system arrangement.

14 Claims, 2 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 2011/0231645 A1* | 9/2011 | Thomas | H04L 9/3236 |
| | | | 713/150 |
| 2015/0180671 A1 | 6/2015 | Yamashita | |
| 2015/0356523 A1 | 12/2015 | Madden | |
| 2016/0292450 A1* | 10/2016 | Ivanov | G06F 21/6218 |
| 2016/0330027 A1* | 11/2016 | Ebrahimi | G06Q 20/02 |
| 2017/0149819 A1 | 5/2017 | Androulaki et al. | |
| 2017/0180125 A1 | 6/2017 | Bobinski | |
| 2017/0316390 A1 | 11/2017 | Smith et al. | |
| 2018/0292522 A1* | 10/2018 | Cavendish | H04L 63/12 |
| 2019/0013931 A1* | 1/2019 | Benini | H04L 9/3033 |
| 2021/0037009 A1* | 2/2021 | Yang | G06K 9/00885 |
| 2021/0119968 A1* | 4/2021 | Schibuk | H04L 63/123 |

OTHER PUBLICATIONS

Search Report from corresponding DE Application No. 102018000471.7, dated Oct. 1, 2018.
"Next Generation of National Digital Identity and Signing," Agency for Digitisation, Jun. 27, 2016, 48 Pages.
Office Action from Korean Application No. 10-2020-7020058, dated Jul. 19, 2021, 6 Pages.

\* cited by examiner

BLOCK-CHAIN BASED IDENTITY SYSTEM

BACKGROUND

The present invention is directed to a method for the confidential verification of an electronic identity, wherein a so-called block chain is applied. The proposed method enables an acting party to recognize a block-chain identity, wherein, however, a level of confidentiality of the respective identity, together with identity attributes, is maintained. The present invention is further directed to a correspondingly adapted identity system and to a computer program product with control commands which implement the method and/or operate the proposed system arrangement.

CN 106682530 A1 shows a method for sharing medical information while maintaining confidentiality. The so-called block-chain technology is used here, inter alia.

U.S. Pat. No. 9,635,000 B1 shows a system for managing identities in a computer network.

US 2017/0149819 A1 shows a computer network in which security mechanisms are implemented which are likewise based on block-chain technology.

The prior art discusses a wide variety of applications for the block-chain technology. The crypto currency Bitcoin is known, as are countless further crypto currencies. Moreover, banks and insurance companies are experimenting with block chains for interbank transactions and for trading platforms. Further applications discussed are public registers (e.g. land register) and identity platforms. The latter is about mapping electronic identities in a block chain and employing the block chain as a kind of data storage for an identity management system.

Besides the block-chain approach, there are the classic, database-based identity management systems and a whole range of mobile identity systems, for example based on UICCs, other tokens or based on cards, via eID cards. The advantage of the block-chain approach is that no central entity is necessary that manages an identity platform.

A problem that has not yet been solved satisfactorily with block-chain-based identity applications is the topic of privacy vs. trust. On the one hand, a consumer of the block-chain identity (relying party) should be able to recognize the level of trust with which a certain identity (or identity attributes) was recorded and confirmed. On the other hand, these identity attributes, particularly in a public block-chain, should not be freely accessible and should not be assignable to one another or to a real person. Moreover, it should not be recognizable with which relying parties a certain identity is related. The user should also have the option of deciding which (individual) attributes to present to a relying party and which not. The attributes that are not presented should not be assignable on the basis of the attributes presented.

SUMMARY

Accordingly, it is an object of the present invention to supply a method which allows an electronic identity to be verified in such a manner that the method can be executed in decentralized manner in a network and, in addition, the greatest possible protection of the identity holder's trust is guaranteed. This should be possible while employing existing infrastructures and should therefore only entail minimal technical effort. It is further an object of the present invention to propose a correspondingly adapted identity system and a computer program product which has control commands for executing the method and/or for operating the system.

Accordingly, a method for the confidential verification of an identity while employing a cryptographically chained list is proposed. This is preferably a so-called block chain.

The method comprises the steps of supplying identity attributes of the identity together with a symmetrical key information item by a user entity, computing a respective hash value for each identity attribute while employing the symmetrical key (keyed hash), in such a manner that it is not possible to infer the hash value of the identity even if the identity attribute is known, writing the computed hash values as at least one list entry into the cryptographically chained list, transmitting an address of the at least one list entry together with the symmetrical key information item from the user entity to a validation entity, validating by the validation entity the at least one list entry having the computed hash values while employing an identity document which has the identity attributes, wherein it is verified whether the identity attributes supplied and saved at the address match the identity attributes of the identity document, and writing a signature of the at least one list entry into the cryptographically chained list in the case of a positive validation of the identity attributes by the validation entity.

The person skilled in the art recognizes here that the individual method steps can have sub-steps. Individual steps can also be executed iteratively in such a manner that, for example, several data or attributes are transmitted individually and/or computation steps can be executed sequentially or in parallel.

The proposed identity system is intended to secure the privacy of the user, while at the same time a relying party is able to assess the level of trust of identity attributes. To a third entity, it is not apparent with which relying party a certain identity is related. Attributes can be revealed individually, wherein the not revealed attributes are not assignable. Moreover, a third entity cannot assign identities, even if individual attributes are publicly known. It is also not necessary to operate a cloud service, in which the actual attributes are deposited, in addition to the block chain.

In addition, a reputation-based identity can be built up with the scheme, in which, for example, individual attributes have been validated frequently but with less trust, while other attributes have possibly been validated less frequently but with a higher level of trust.

The basic concept is divided into the steps "A. Initial identification" (enrollment, validation) and "B. Utilization of identity":

A. Initial identification:

In order to initially register an identity, the following steps are carried out according to one aspect of the present invention:

1. An end user determines (e.g. in a mobile application or via a web interface) the attributes that he would like to have validated, including their content (e.g. name, date of birth, place of birth, . . . );
2. A symmetrical key is generated, which is employed to compute a keyed hash value of the attributes. A separate hash value is computed for each attribute. By using a keyed hash method, it is not possible for third parties to assign the identity on the basis of known attributes (e.g. name) without knowing the key;
3. The end user publishes the keyed hash values of his attributes in the block chain. So far, he has only declared the attributes himself, but they have not yet been validated by third parties;
4. In the next step, the user turns to a validation service that is able to verify identities (e.g. with a VideoIdent method, in a branch office, etc.). The user presents to this service his block-chain address, in which the keyed hash values of the attributes are saved. Moreover, he presents the key to the hash computation, with which the service can verify the correctness of the hash values, as well as an ID document;

5. The service carries out an identification and compares the self-declared attributes from the block chain with the data from the ID document. If the data match, the service carries out a block-chain transaction to the address of the user, in which it also transfers a signature over the hash values and the level of trust of the identification (e.g. according to electronic identification, authentication and trust service eIDAS level). The secret is deleted again subsequently.

6. Since the attributes have now been validated and a signature over the hash values has been stored in the block chain, the public key of the validation service is stored as a certificate with a corresponding public key infrastructure PKI, if required. This enables third parties to assess that the attributes have been verified by a recognized and trustworthy institution.

B. According to the invention, the validated identity can be utilized as follows:

1. The end user presents his block-chain address, the hash key and the content of the required attributes to a relying party.
2. The relying party computes the keyed hash value from the content of the attributes with the aid of the user key and compares it with the data stored in the block chain. Moreover, the relying party verifies the signature(s) of the validation service(s) over the data.
3. If necessary, the relying party carries out a challenge-response protocol with the user in order to obtain proof that he has the secret key to the block-chain account. The relying party thus has proof that it is actually the owner of the block-chain account who passes on the attributes.
4. After the verification has been completed, the relying party deletes the user key.

In one embodiment of the invention, each attribute is represented by a separate block-chain address. It is thus impossible in addition to assign the individual attributes to a common identity. Step 3 of the utilization phase B is then executed separately for each attribute.

In a further embodiment it is provided that the user does not issue the key for the computation of the keyed hash value to the relying party (from where it could potentially be passed on), but to a trust service of his choice, which then assumes the resolution of the hash values and the comparison to the plain text values for the relying party (and after authorization by the user, e.g. via an OAuth 2.0 protocol).

The proposed method serves for the confidential verification of the identity, since it is prevented according to the invention that information of the identity holder is disclosed unnecessarily. For example, according to the invention, it is possible to store the individual identity attributes, such as, for example, name, address or date of birth, at different positions within the cryptographically chained list. The cryptographically chained list is preferably a so-called block chain.

A block chain is composed of several data entries, which are connected to each other and the connectors represent hash values in each case. A cryptographically chained list is thus a continuously expandable list of data sets, which are also referred to as blocks or, in the present case, list entries. It is possible for each list entry to have a cryptographically secure hash of the previous block, a time stamp and transaction data. According to the invention, the advantages of the conventional block chain also result, since the individual identity attributes can be coded as list entries or blocks.

In order to model the electronic identity, identity attributes such as, for example, the name of the identity holder are supplied. This can be effected manually in such a manner that a user names the identity attributes via an interface and allocates values to these. Since the user merely operates the system, this is designated presently as a user entity, which refers to the terminal device employed by the user for entering data. The user entity can thus be, for example, a mobile terminal device with a web interface. In this manner, the user can be supplied with an input mask in which he enters the identity attributes.

For each of these identity attributes a hash value is computed, which is preferably present as a keyed hash value. By means of such a keyed hash value, it is not possible for third parties to infer the identity, even if they have the identity attributes. By employing such a keyed hash method, it is also not possible for attackers either in the case of known attributes to assign the identity without knowing the key. Thus, the confidentiality of the identity of the user is always maintained, which is particularly advantageous for the reason that the data are saved in the cryptographically chained list and must be made accessible to a querying entity.

The computed hash values are then saved in the block chain as a block or as a list entry. It is possible to create a separate list entry for each hash value or also to store several hash values as a single list entry. In accordance with the known block-chain technology, the hash values are thus integrated into the cryptographically chained list and distributed to further network nodes in terms of network technology. The address of this list entry or of these list entries within the block chain is transmitted from the user to the validation entity together with the symmetrical key information item. This enables the validation entity to validate the list entries, i.e. to check them for correctness.

The user has initially created the identity attributes himself, and it is therefore advantageous in this method step to actually verify these specifications. For this purpose, the user can supply an identity document, for example a passport, and carry out a remote identification. This enables the validation entity to check whether the list entries of the block chain that model the identity attributes are actually correct and match data of the identity document.

The so-called VideoIdent method is known as a possible verification, in which it is possible for a user to transmit an identification document, for example by means of a web cam. The validation entity thus supplies a data interface which enables the user to identify himself and thus to supply the correct identity attributes of the identity document without great effort. Here, further methods are known which make it possible to read out the identity document in such a manner that the identity attributes can be exploited. For example, the name and address can be read out from a passport.

Consequently, the identity attributes supplied are present as specified by the user, and the validation entity has the identity attributes which were read out from the identity document. In particular, it is also possible to mutually compare the two attributes and thus to verify the correctness. In the present case, this is referred to as a validation, which proceeds positively if the identity attributes supplied match the identity attributes read out from the identity document. If these attributes do not match, the user possibly has specified incorrect values and this is recognized. It can then be caused to repeat the method, and the user must again supply his identity attributes. It is also possible that the identity attributes were not specified incorrectly, but rather an attack can also take place, which is recognized during the validation. In the event of a negative validation, the method is therefore either terminated or executed again in either case.

In the case that a positive validation takes place, a writing of a signature of the at least one list entry into the cryptographically chained list is effected. Thus, the list entry which has the identity attributes or their hash values is signed and it is established that the identity attributes are correctly saved in the block chain.

According to a further aspect of the present invention, the address of the at least one list entry, the symmetrical key information item and the identity attributes are transmitted from the user entity to an entity which queries the identity, whereupon this querying entity verifies the written at least one list entry having the computed hash values on the basis of the transmitted data. This has the advantage that the querying entity, also referred to as a relying party, can evaluate all the data that are necessary to determine an identity, whereas a third party does not see with which relying party a particular identity is related. With the transmitted data, the querying entity, i.e. the relying party, can verify the data saved in the block chain, which is carried out by means of a comparison. The querying entity can be, for example, a computing unit that communicates with the user entity via a network. The querying entity thus has every opportunity to verify an identity on the basis of the block-chain technology.

According to a further aspect of the present invention, the verification of the at least one list entry also includes a verification of the written signature. This has the advantage that the transactions of the validation entity can also be taken into account and the signature supplied by the validation entity can likewise be employed for the verification. Here, the person skilled in the art knows methods which show how a signature is to be evaluated. The signature can be read out from the block chain by the so-called relying party.

According to a further aspect of the present invention, a challenge-response authentication is carried out between the user entity and the querying entity. This has the advantage that the transmitted data were actually transmitted from the user entity to the relying party by the correct user. This secures the communication between the user entity and the relying party, so that attack scenarios are prevented. The challenge-response method is typically initiated by the relying party and starts with a challenge message to the user entity, which replies with a response message that contains, among other things, a signature of the challenge with the private key of the user entity.

According to a further aspect of the present invention, the hash values are so-called keyed hash values. This has the advantage that by means of this method it is not possible to infer an identity from known identity attributes and the identity therefore always remains concealed, even if the identity attributes or their hash values can be read out from the block chain.

According to a further aspect of the present invention, the cryptographically chained list is present as a block chain. This has the advantage that security mechanisms can be employed which have been implemented as part of the so-called block-chain technology, although it is possible according to the invention to protect the information from unauthorized access. The block-chain technology is thus expanded to include rules that secure the user's privacy. This allows the proposed method to be integrated into an existing infrastructure.

According to a further aspect of the present invention, the validation while employing the identity document includes a video identification method. This has the advantage that a user can supply his data via a web-based interface and it can thus be ensured that the correct data and/or identity attributes of the user are actually present. A video identification method is, for example, the so-called VideoIdent method, in which the user holds an identification document to a camera. The document can then be read out and the user data are compared with the specified identity attributes. Alternatives to such a video identification method are the conventional method, in which the customer, for example, presents himself in a bank branch office and identifies himself or the employment of an electronic ID card such as, for example, the electronic personal identification card. This can also be combined with the present method and the correct identity attributes can be procured in this manner.

According to a further aspect of the present invention, the writing in of the signature includes the writing of a level of trust (level of assurance). This has the advantage that a level of trust can be deposited in the block chain, which describes how high the trust in the correctness of the identification is. The EU regulation on electronic identification and trust services for electronic transactions can also be employed in this context. In particular, the so-called eIDAS level of trust can be employed. eIDAS stands for the European regulation on electronic IDentification, Authentication and trust Services. A value thus can be saved that indicates the probability with which the data recorded from the identity document are correct.

According to a further aspect of the present invention, the writing of the computed hash values takes place in each case at different addresses in the cryptographically chained list. This has the advantage that the hash values can be saved in different blocks or list entries and thus it is not apparent to a third party that these hash values and/or the corresponding identity attributes are assigned to a specific profile or identity. They thus are deposited independently of each other and there is initially no apparent connection between these data. This in turn protects the user's privacy and the hash values cannot be correlated.

According to a further aspect of the present invention, a trustworthy entity is interposed in a communication between the user entity, the querying entity and/or the validation entity. This has the advantage that individual method steps can also be executed by such an intermediate entity, and thus not all data must always be transmitted to the respective entities. The sensitive data are thus further distributed over the network, and no collection points of the data are formed which could be read out in the event of unauthorized access. For example, it is possible not to output the key for the computation of the keyed hash value to the relying party, but to transmit it to an intermediate service which then assumes the resolution of the hash values and the comparison to the plain text values for the relying party.

According to a further aspect of the present invention, the user entity, the querying entity and the validation entity are connected in terms of communication technology. This has the advantage that the present invention can be implemented in the computer and all the entities involved can be present as computing units. The block chain is also connected to the entities in terms of data technology, for which purpose network components must be provided. For example, the individual entities can be a server or a client.

According to a further aspect of the present invention, the validation entity is supplied by a network-based service. This has the advantage that a conventional user interface can be provided which executes the identification method and reads out the identification document. Thus, a so-called remote identification can be carried out.

According to a further aspect of the present invention, the method is executed in decentralized manner in a data technology network. This has the advantage that no central entities are to be provided that carry out the identity management, but rather the block-chain technology is to be applied, which is based on decentralized data keeping and data management. Thus, merely network components, i.e. the underlying infrastructure, are central, which means that a server can be employed in terms of network technology, but the individual method steps are nevertheless executed in decentralized manner. In particular, parts of the block chain can be kept redundant and distributed in the network.

The object is also achieved by an identity system for the confidential verification of an identity while employing a cryptographically chained list, having a user entity adapted to supply identity attributes of the identity together with a symmetrical key information item, a cryptographic unit adapted to compute a respective hash value for each identity attribute, such that, even if the identity attribute is known, it is not possible to infer the identity, a data interface adapted to write the computed hash values as at least one list entry into the cryptographically chained list, a network component adapted to transmit an address of the at least one list entry together with the symmetrical key information item from the user entity to a validation entity, the validation entity adapted for validation by the validation entity of the at least one list entry and the computed hash values while employing an identity document which has the identity attributes, wherein it is verified whether the identity attributes supplied and saved at the address match the identity attributes of the identity document, and a further data interface adapted to write a signature of the at least one list entry into the cryptographically chained list in the case of a positive validation of the identity attributes by the validation entity.

The person skilled in the art recognizes here that the cryptographic unit can be integrated in the user entity, for example. The data interface can be uniform, wherein it is also possible to implement different data interfaces. The individual entities can be kept available physically or in terms of software technology.

The object is further achieved by a computer program product with control commands that implement the proposed method and/or operate the proposed system.

According to the invention, it is particularly advantageous that the proposed method has method steps that supply functionality that can be structurally reproduced by the system. The system further includes structural features that can also be reproduced by the method steps. The computer program product serves both to execute the method proposed and to operate the identity system. For example, the computer program product can also include a network protocol.

BRIEF DESCRIPTION OF THE DRAWINGS

Further advantageous embodiments are explained in more detail with reference to the attached figures. The figures are described as follows.

DETAILED DESCRIPTION OF VARIOUS EMBODIMENTS

Figure 1:
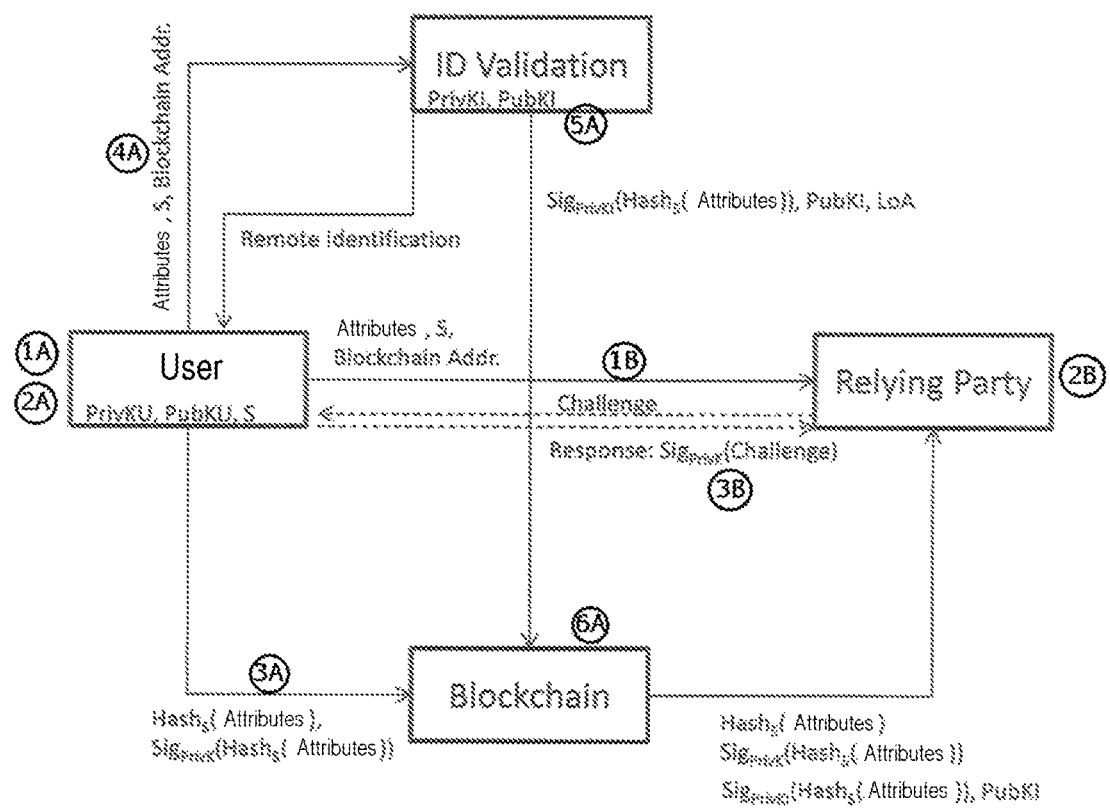
FIG. 1 shows the identity system according to the invention and corresponding communication paths.

FIG. 1 shows a schematic structure of the identity system, wherein a user entity is indicated on the left side, which serves for the end user to specify 1A the identity attributes, whereupon a symmetrical key S is generated which is employed 2A to compute the keyed hash values. The functionalities, which are designated with an A, serve for the initial identification, and the functionalities 1A, 2A, . . . , 6A correspond to the points as already stated under "A. Initial identification". The functionalities with a suffix B refer to the utilization of the validated identity, and the corresponding functionalities 1B, 2B and 3B likewise correspond to the points already listed.

The functionality 3A refers to the publication of the keyed hash values of the identity attributes in the block chain. The parameters as listed in the present FIG. 1 have the following meaning:

Attributes: plain text of the attributes (e.g. name, address . . . )
S: symmetrical key for keyed hash computation
PrivKU/PubKU: "user key pair" of the block-chain account
PrivKI, PubKI: key pair (incl. certificate) of the ID validation service
LoA: security level of the ID verification (e.g. according to eIDAS, ISO, NIST, . . . )

In FIG. 1, "ID Validation" stands for the validation entity and "Relying Party" for the querying entity, i.e. the unit which is to rely on a user identity.

When the user entity has deposited the hash values of the attributes in the block chain 3A, the attributes are sent 4A to the validation entity together with the key S and the block-chain address of the hash values. The validation entity then executes a so-called remote identification, which can be effected, for example, while employing a VideoIdent method. The validation entity thus supplies 5A a functionality for executing the identification and compares the attributes from the block chain declared by the user with the data from the identification document. If the validation is positive, the service or the validation entity executes 5A a block-chain transaction, and the identification attributes are thus validated and a corresponding signature is deposited 6A in the block chain.

The stored identity is then employed, wherein a relying party wishes to query the identity of a user. For this purpose, the end user presents the corresponding block-chain address, the hash key and the content of the required attributes 1B to the relying party. The relying party, i.e. the querying entity, now has all the data it needs to verify 2B the data stored in the block chain and compare them with the data supplied by the user. It can thus be verified whether the identity stored in the block chain is actually correct. For example, a signature of the validation entity can be verified 2B for this purpose.

In order to verify whether the secret key belongs to the block-chain account of the user, a so-called challenge-response protocol can be executed 3B, which secures the data communication between the user entity and the relying party.

Figure 2:
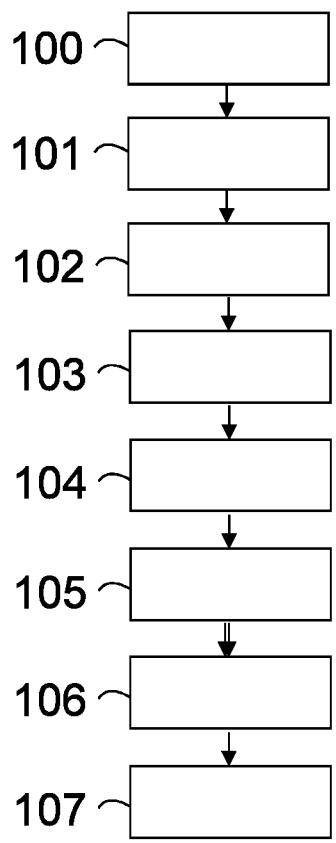
FIG. 2 shows a schematic flow diagram of a method for the confidential verification of an identity according to an aspect of the present invention.

FIG. 2 shows a schematic flow diagram of a method for the confidential verification of an identity while employing a cryptographically chained list, having the steps of supplying 100 identity attributes of the identity together with a symmetrical key information item by a user entity, computing 101 a respective hash value for each identity attribute in such a manner that it is not possible to infer the identity even if the identity attribute is known, writing 102 of the computed 101 hash values as at least one list entry into the cryptographically chained list, transmitting 103 an address of the at least one list entry together the symmetrical key information item from the user entity to a validation entity, validating 104 by the validation entity the at least one list entry having the computed 101 hash values while employing an identity document which has the identity attributes, wherein it is verified whether the identity attributes supplied 100 and saved at the address match the identity attributes of the identity document, and writing 105 a signature of the at least one list entry into the cryptographically chained list in the case of a positive validation of the identity attributes by the validation entity.

Further, the address of the at least one list entry, the symmetrical key information item and the identity attributes are transmitted 106 from the user entity to an entity that queries the identity, whereupon this querying entity verifies 107 the written 102 at least one list entry having the computed 101 hash values on the basis of the transmitted 106 data.

The proposed method covers, among other things, the requirements discussed:

It is not apparent to a third entity with which relying party a certain identity is related: The relying party does not actively carry out a block-chain transaction, so that the relationship is not recognizable to third parties.

Attributes can be revealed individually, without the non-revealed attributes being assignable: by employing a separate block-chain address for each attribute, it is not possible to assign them to one another.

Moreover, a third entity cannot assign identities, even if individual attributes are publicly known: without the user key, an unauthorized third party cannot assign block-chain data to publicly known attributes. Even with the user key, he can only assign it to attributes that he already knows. Nevertheless, he cannot personally identify the user because he does not have a private key of the block-chain account.

It is also not required to operate a cloud service, in which the actual attributes are deposited, in addition to the block chain: no further references to a cloud service are required, since only keyed hash values are deposited in the block chain. The content of the attributes is exchanged directly between the user and the relying party.

In addition, a reputation-based identity can be built up with the scheme: the number of validations of an attribute enables the relying party to recognize how often the identity has been validated.

The invention claimed is:

1. A method for the confidential verification of an identity while employing a cryptographically chained list, having the steps of:
supplying identity attributes of the identity together with a symmetrical key information item by a user entity;
computing a respective hash value for each identity attribute in such a manner that it is not possible to infer the identity even if the identity attribute is known;
writing the computed hash values as at least one list entry into the cryptographically chained list;
transmitting an address of the at least one list entry together with the symmetrical key information item from the user entity to a validation entity;
validating by the validation entity the at least one list entry having the computed hash values while employing an identity document which has the identity attributes, wherein it is verified whether the identity attributes supplied and saved at the address match the identity attributes of the identity document; and
writing a signature of the at least one list entry into the cryptographically chained list in the case of a positive validation of the identity attributes by the validation entity;
wherein the hash values are keyed hash values.

2. The method according to claim 1, wherein a transmission of the address of the at least one list entry, the symmetrical key information item and the identity attributes is effected from the user entity to an entity which queries the identity, whereupon this querying entity verifies the written at least one list entry having the computed hash values on the basis of the transmitted data.

3. The method according to claim 2, wherein the verification of the at least one list entry also includes a verification of the written signature.

4. The method according to claim 2, wherein a challenge-response authentication is carried out between the user entity and the querying entity.

5. The method according to claim 1, wherein the cryptographically chained list is present as a block chain.

6. The method according to claim 1, wherein the validation while employing the identity document includes a video identification method.

7. The method according to claim 1, wherein the writing of the signature includes a writing of a level of trust which indicates how high the trust in the correctness of the identity is.

8. The method according to claim 1, wherein the writing of the computed hash values takes place in each case at different addresses of the cryptographically chained list.

9. The method according to claim 1, wherein a trustworthy entity is interposed in a communication between the user entity, the querying entity and/or the validation entity.

10. The method according to claim 1, wherein the user entity, the querying entity and the validation entity are connected in terms of communication technology.

11. The method according to claim 1, wherein the validation entity is supplied by a network-based service.

12. The method according to claim 1, wherein the method is executed in decentralized manner in a data technology network.

13. An identity system for the confidential verification of an identity while employing a cryptographically chained list, having:
a user entity adapted to supply identity attributes of the identity together with a symmetrical key information item;
a cryptographic unit adapted to compute a respective hash value for each identity attribute, in such a manner that it is not possible to infer the identity even if the identity attribute is known;
a data interface adapted to write the computed hash values as at least one list entry into the cryptographically chained list;
a network component adapted to transmit an address of the at least one list entry together with the symmetrical key information item from the user entity to a validation entity;
the validation entity adapted for validation by the validation entity of the at least one list entry having the computed hash values while employing an identity document which has the identity attributes, wherein it is verified whether the identity attributes supplied and saved at the address match the identity attributes of the identity document; and a further data interface adapted to write a signature of the at least one list entry into the cryptographically chained list in the case of a positive validation of the identity attributes by the validation entity;

wherein the hash values are keyed hash values.

14. A non-transitory computer program product with control commands that execute the method according to claim 1 when these are executed on a computer.

* * * * *